United States Patent
Choi

(10) Patent No.: US 9,430,002 B2
(45) Date of Patent: Aug. 30, 2016

(54) ASSEMBLING STRUCTURE FOR MODULE AND ELECTRONIC DEVICE HAVING IT

(71) Applicant: Samsung Electronics Co., Ltd., Suwon-si, Gyeonggi-do (KR)

(72) Inventor: Jong-Min Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 14/158,120

(22) Filed: Jan. 17, 2014

(65) Prior Publication Data

US 2014/0204538 A1 Jul. 24, 2014

(30) Foreign Application Priority Data

Jan. 21, 2013 (CN) ..................... 2013 2 0030993 U
Oct. 25, 2013 (KR) ......................... 10-2013-0127886

(51) Int. Cl.
*G06F 1/16* (2006.01)
*H04M 1/02* (2006.01)

(52) U.S. Cl.
CPC ........... *G06F 1/1686* (2013.01); *G06F 1/1626* (2013.01); *G06F 1/1684* (2013.01); *G06F 1/1688* (2013.01); *H04M 1/026* (2013.01)

(58) Field of Classification Search
CPC .. G06F 1/1684; G06F 1/1686; G06F 1/1637; G06F 1/1688; H04M 1/026
USPC .......................... 361/679.23, 679.01–679.45, 361/679.55–679.59
See application file for complete search history.

(56) References Cited

U.S. PATENT DOCUMENTS

| | | | | |
|---|---|---|---|---|
| 5,613,011 A | * | 3/1997 | Chase | H04R 1/406 381/355 |
| 6,134,335 A | * | 10/2000 | Yang | H04R 5/02 361/679.23 |
| 6,678,152 B2 | * | 1/2004 | Kim | G06F 1/1605 292/DIG. 53 |
| 7,126,816 B2 | * | 10/2006 | Krah | G06F 1/1616 348/14.08 |
| 8,767,392 B2 | * | 7/2014 | Wang | G06F 1/1686 248/187.1 |
| 2005/0195322 A1 | * | 9/2005 | Park | H04N 5/2252 348/373 |
| 2010/0039763 A1 | * | 2/2010 | Hsu | G06F 1/1616 361/679.26 |

FOREIGN PATENT DOCUMENTS

| | | |
|---|---|---|
| KR | 10-2012-0100509 A | 9/2012 |
| KR | 10-2012-0106001 A | 9/2012 |
| KR | 10-1187922 B1 | 10/2012 |

* cited by examiner

*Primary Examiner* — Nidhi Thaker
(74) *Attorney, Agent, or Firm* — Jefferson IP Law, LLP

(57) ABSTRACT

A mounting structure for mounting a module and an electronic device having the structure are provided. The electronic device includes at least one module, a bracket having an opening configured to contain the at least one module, a support rib extended upwardly along a boundary of the opening to support an outer circumferential surface of the at least one module, and two stopper protrusions formed on the outer circumferential surface of the at least one module in a protrusion manner to support the at least one module being restrained by the bracket and prevent the at least one module from completely passing through the opening, wherein a lower portion of the at least one module is partially inserted into the opening of the bracket.

18 Claims, 9 Drawing Sheets

ASSEMBLING STRUCTURE FOR MODULE AND ELECTRONIC DEVICE HAVING IT

CROSS-REFERENCE TO RELATED APPLICATIONS

This application claims the benefits under 35 U.S.C. §119(a) of a Chinese utility model application filed on Jan. 21, 2013 in the State Intellectual Property Office and assigned Serial number 201320030993.8 and a Korean patent application filed on Oct. 25, 2013 in the Korean Intellectual Property Office and assigned Serial number 10-2013-0127886, the entire disclosure of which is hereby incorporated by reference.

TECHNICAL FIELD

The present disclosure relates to an electronic device. More particularly, the present disclosure relates to a mounting structure for mounting various modules, and an electronic device having the structure.

BACKGROUND

An electronic device has recently been developed that has various functions in accordance with a user's demands. For example, in addition to a basic function of calling a peer user, a portable electronic device for communication can be used to play various songs by using a Motion Picture Experts Group Layer 3 (MP3) sound source, enjoy web surfing using a wireless Internet, download various programs using the Internet, and reproduce and watch high-definition videos at high speed.

In addition, a subject of photography can have their image captured using at least one high-definition image pickup device. In particular, the function of capturing not only a still picture, but also a motion picture, and in particular a three dimensional image, have become popular.

Since a plurality of individual modules for performing the aforementioned various functions should be placed at proper places in the electronic device, the electronic device has gradually been improved to harmoniously operate the modules which perform various functions and which are disposed at respective positions. In addition thereto, due to the increase in the individual modules capable of performing various functions, the electronic device has inevitably increased in size, which is at odds with recent trends of requiring a slimmer size, while having various functions.

Accordingly, manufacturers of electronic devices are competing with each other to provide electronic devices having a slim size while performing a greater number of improved functions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an improved module mounting structure and an electronic device having the structure.

Another aspect of the present disclosure is to provide a module mounting structure implemented to contribute to a slim-sized electronic device, and an electronic device having the structure.

Another aspect of the present disclosure is to provide a module mounting structure for improving an assembly capability, and an electronic device having the structure.

Another aspect of the present disclosure is to provide a module mounting structure implemented to avoid an increase in a manufacturing cost due to an additional processing for assembling a module, and an electronic device having the structure.

In accordance with an aspect of the present disclosure, an electronic device is provided. The electronic device includes at least one module, a bracket having an opening configured to contain the at least one module, a support rib extended upwardly along a boundary of the opening to support an outer circumferential surface of the at least one module, and two stopper protrusions formed on the outer circumferential surface of the at least one module to support the at least one module being restrained by the bracket and prevent the at least one module from completely passing through the opening, wherein a lower portion of the module is partially inserted into the opening of the bracket.

In accordance with another aspect of the present disclosure, a module mounting structure is provided. The module mounting structure includes at least one module, a bracket having an opening configured to contain the at least one module, a support rib extended upwardly along a boundary of the opening to support an outer circumferential surface of the at least one module, and two stopper protrusions formed on the outer circumferential surface of the at least one module being restrained by the bracket and prevent the at least one module from completely passing through the opening, wherein a lower portion of the module is partially inserted into the opening of the bracket.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
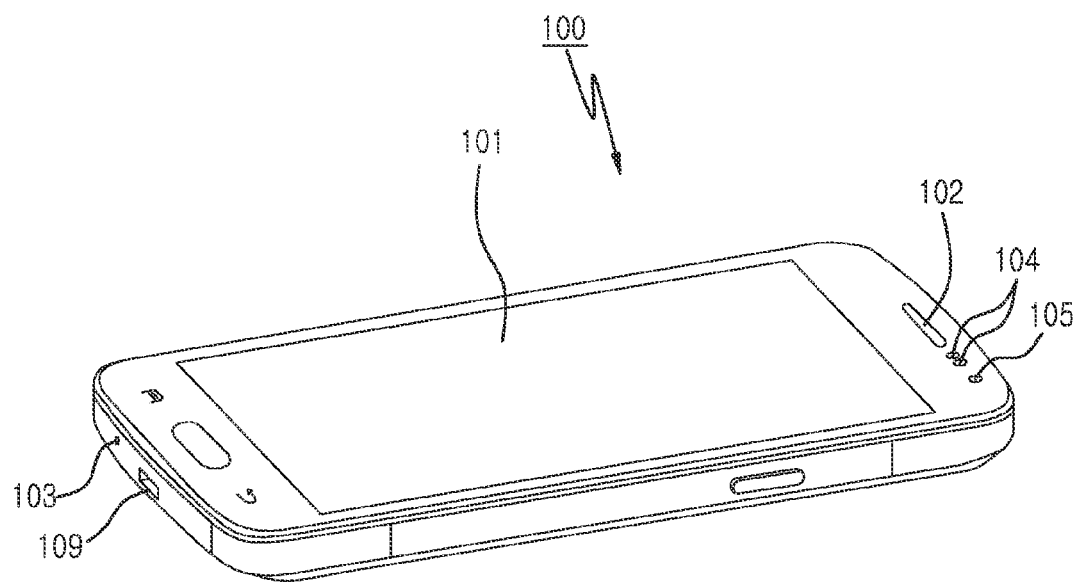
FIG. 1 is a perspective view illustrating a front side of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following descriptions according to various embodiments of the present disclosure can be applied to various types of electronic devices having at least one individual module for performing a corresponding function.

In the following descriptions according to the various embodiments of the present disclosure, a camera module is illustrated and a structure of mounting the camera module on an electronic device is described. However, the various embodiments of the present disclosure are also applicable not only to the camera module but also to various modules that can be included in the electronic device. For example, such a module is applicable to at least one of a speaker module, a microphone module, a vibrator module, various sensor modules, an ear jack module, a key button module, a module having an illumination means, and an interface connector module for various communications.

Although the various embodiments of the present disclosure are described by taking an example of a bar-type electronic device which includes a touch screen as a display unit and which uses a touch pen for manipulating the touch screen, the present disclosure is not limited thereto. For example, various devices including a touch pen utilized as one input means of a display module can be used as the electronic device, such as a Personal Digital Assistant (PDA), a laptop computer, a mobile phone, a smart phone, a netbook, a Mobile Internet Device (MID), a Ultra Mobile Personal Computer (UMPC), a Tablet Personal Computer (TPC), a navigation system, etc.

Figure 2:
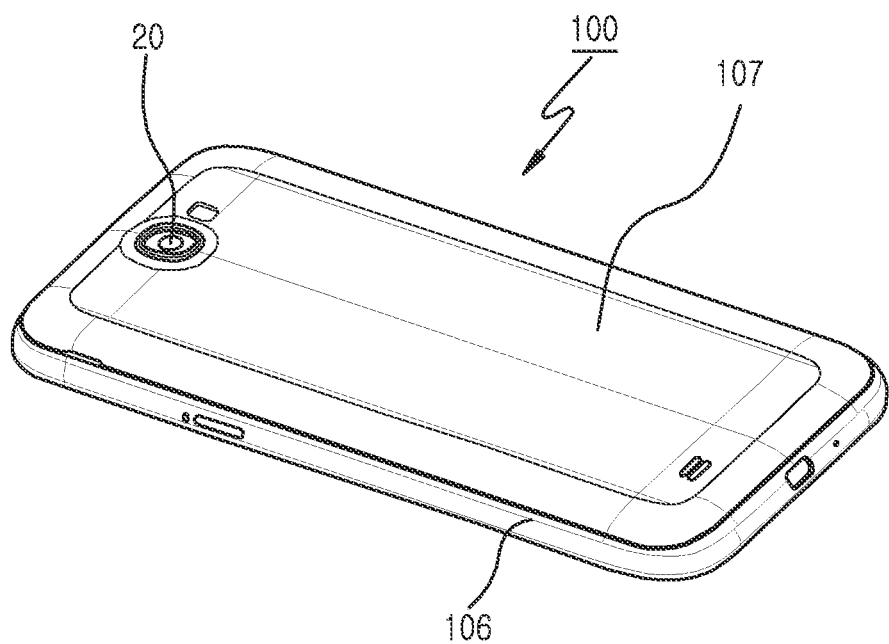
FIG. 2 is a perspective view illustrating a rear side of an electronic device according to an embodiment of the present disclosure.

FIG. 1 is a perspective view illustrating a front side of an electronic device according to an embodiment of the present disclosure. FIG. 2 is a perspective view illustrating a rear side of an electronic device according to an embodiment of the present disclosure.

Referring to FIG. 1 and FIG. 2, an electronic device 100 includes a display module 101 in a front side, a speaker module 102 for receiving a voice of a peer user in an upper portion of the display module 101, and a microphone module 103 for transmitting speech to the peer user in a lower portion of the display module 101, in order to perform a basic communication function. According to an embodiment, the display module 101 may be a touch screen device which inputs and outputs data in the same position. According to an embodiment, the display module 101 may include a sensor means dedicated to object sensing for detecting data which is input by an additional object (e.g., a touch pen, such as a stylus pen). According to an embodiment, an interface connector module 109 for performing the function of transmitting/receiving data in a wired fashion with respect to an external device or for receiving external power to charge a battery pack may be disposed on one side of the microphone module 103 of the electronic device 100.

According to various embodiments, at least one sensor module 104 including electronic components for sensing to perform various functions of the electronic device 100 may be disposed around the speaker module 102 of the electronic device 100. According to an embodiment, the sensor module 104 may be installed to operate the electronic device 100 in a variable manner in accordance with a surrounding environment. According to an embodiment, the sensor module 104 may include an illumination sensor which detects an ambient illumination and automatically adjusts a brightness of the display module 101 in accordance with the detected illumination value, and if the electronic device 100 is attached to a head portion of a user during a call or if a flip cover is used as an accessory, may include a proximity sensor, an infrared sensor, or the like for performing a corresponding function or for deactivating the display module 101 upon detecting whether the flip cover is open or closed. According to an embodiment, a camera module 105 for Video Telephony (VT) with respect to the peer user may be installed to a proper place in the front side of the electronic device 100.

Referring to FIG. 2, the electronic device 100 may have a battery cover 107 in a rear case frame 106 constituting a rear side of the electronic device 100 in an attachable/detachable manner. According to an embodiment, a battery pack mounting portion for containing a battery pack (not shown) may be disposed to the rear case frame 106, and may be applied in such a manner that, after the battery pack is mounted on the battery pack mounting portion, the rear side of the electronic device 100 is finished using the battery cover 107. According to an embodiment, the battery cover 107 may constitute a part of an exterior of the rear side of the electronic device 100. According to an embodiment, another camera module 20 may be disposed on the rear side of the electronic device 100. According to an embodiment, the camera module 20 may capture a panoramic view including the subject of photography in the form of still or motion pictures.

According to various embodiments of the present disclosure, the aforementioned various modules are generally applicable to the electronic device 100 as an additional module (unit), and have a structure for electrical connection with a main board of the electronic device 100. According to an embodiment, such modules may not be mounted on the main board. According to an embodiment, if the modules are not mounted on the main board (or even if they are mounted thereon), the modules may be mounted on a case frame or a bracket additionally provided in the electronic device 100. According to an embodiment, the additional bracket is placed inside the electronic device, and may perform a function of supporting the display module 101.

According to various embodiments of the present disclosure, a mounting structure in which the camera module 20 is mounted on the bracket 30 (See FIG. 3) is illustrated and described. According to an embodiment, even if the same camera module is mounted while excluding a rib thickness of a mounting portion of the bracket 30 to which the camera module 20 is mounted, the camera module 20 can be mounted with a significantly lower height than the conventional case. As a result, this can contribute to a slim size of the electronic device 100.

Hereinafter, a specific mounting structure of the camera module 20 will be described in detail.

Figure 3:
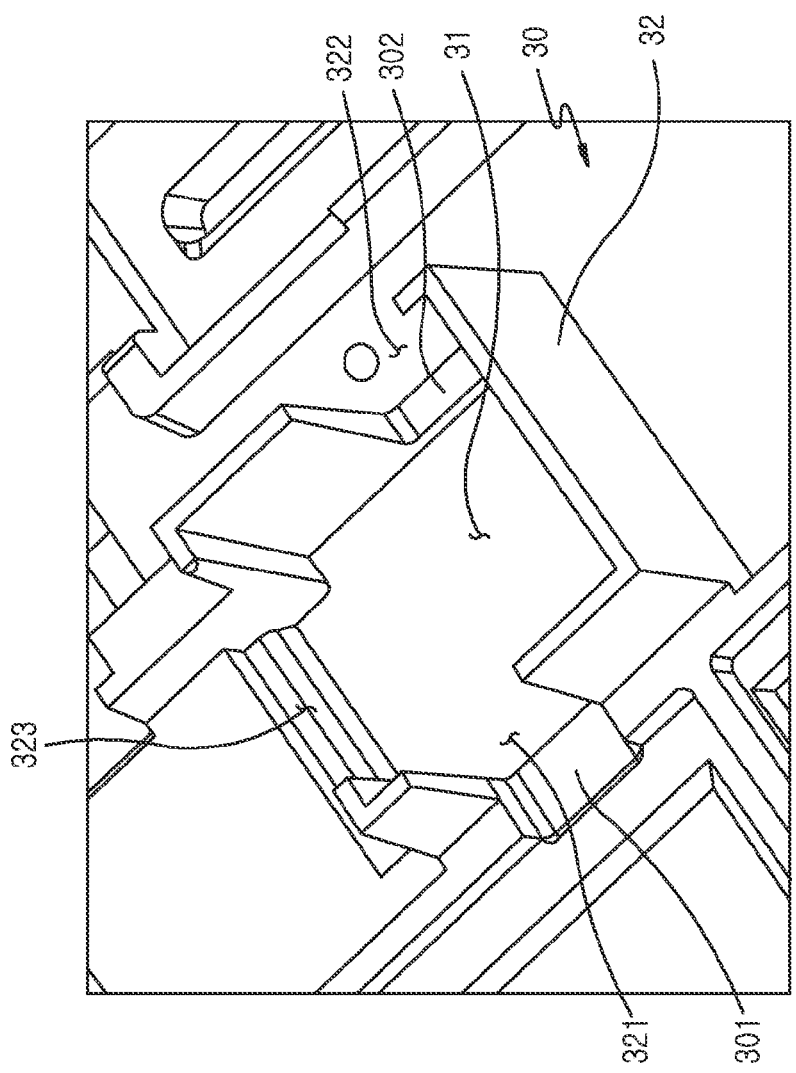
FIG. 3 is a partial perspective view illustrating a structure of a bracket for mounting a camera module according to an embodiment of the present disclosure.
Figure 4:
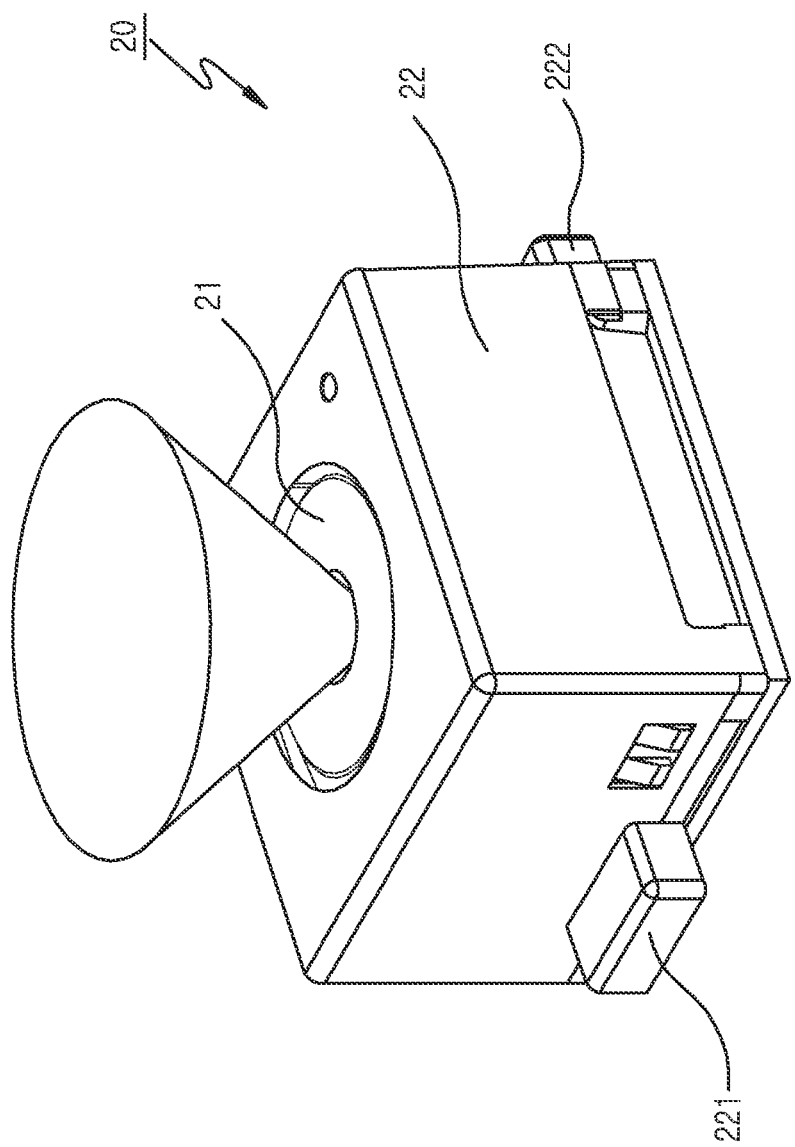
FIG. 4 is a perspective view illustrating a camera module according to an embodiment of the present disclosure.

FIG. 3 is a partial perspective view illustrating a structure of a bracket for mounting a camera module according to an embodiment of the present disclosure. FIG. 4 is a perspective view illustrating a camera module according to an embodiment of the present disclosure.

Referring to FIG. 3 and FIG. 4, a mounting structure in which the camera module 20 is mounted on the bracket 30 disposed inside the electronic device 100 is illustrated and described. However, the present disclosure is not limited thereto, and thus the mounting structure of the camera module 20 can also be applied to a case frame of the electronic device 100. According to an embodiment, the bracket 30 on which the camera module 20 is mounted may be constructed with an element for supporting the display module 101 in the rear side thereof. However, in addition to the display module 101, various electronic components may also be supported.

According to various embodiments of the present disclosure, the bracket 30 may include an area for mounting the camera module 20. According to an embodiment, the area for mounting the camera module 20 may be formed with an opening 31. According to an embodiment, a support rib 32 extended by a specific height along a boundary of the opening 31 may be formed. Therefore, the camera module 20 may be mounted on the bracket 30 in such a manner that a body 22 of the camera module 20 is supported by the support rib 32.

According to various embodiments, a pair of open portions 321 and 322 may be formed in the support rib 32. The open portions 321 and 322 may be respectively formed to contain corresponding stopper protrusions 221 and 222 formed on the body 22 of the camera module 20 in a protrusion manner. According to an embodiment, in a lower portion of each of the open portions 321 and 322, mounting ends 301 and 302 may be formed on a lower portion of the bracket 30. Therefore, the mounting ends 301 and 302 have a structure in which each of the stopper protrusions 221 and 222 of the camera module 20 are restrained, and thus can be constructed to prevent the camera module 20 from being moved to the other side by passing through the open portion 31. According to an embodiment, each of the mounting ends 301 and 302 may be formed with a height equal to or lower than that of the surface of the bracket 30.

According to various embodiments, the pair of open portions 321 and 322 may be disposed at opposite positions. That is, the first open portion 321 and the second open portion 322 may be formed at positions facing each other. According to an embodiment, the first stopper protrusion 221 formed on the body 22 of the camera module 20 in a protrusion manner may be contained through the first open portion 321, and may be mounted on the first mounting end 301 formed on the bracket 30. According to an embodiment, the second stopper protrusion 222 formed on the body 22 of the camera module 20 in a protrusion manner may be contained through the second open portion 322, and may be mounted on the second mounting end 302 formed on the bracket 30. Since one pair of stopper protrusions 221 and 222, facing each other, of the camera module 20 are respectively mounted through one pair of the open portions 321 and 322, facing each other, of the support rib 32 of the bracket 30, the camera module 20 may randomly move to the left and the right after being mounted.

According to various embodiments, another third open portion 323 may be formed at a position at which the first and second open portions 321 and 322 of the support rib 32 are not formed. According to an embodiment, the third open portion 323 may be used to take out an electrical connection means (e.g., a flexible printed circuit, etc.) of the camera module 20 to be mounted.

According to various embodiment, the camera module 20 may have the body 22 formed to contain the image sensor 21. The body 22 may be partially or fully molded with a synthetic resin material. One pair of the stopper protrusions 221 and 222 may be insert-molded when the body 22 is insert-molded. According to an embodiment, the stopper protrusions 221 and 222 may be formed with a specific height from a bottom surface of the body 22 of the camera module 20. This is to allow a bottom portion of the camera module 20 to be mounted through the opening within a rib thickness of the bracket 30 when the camera module 20 is fixed by passing through the opening 31 of the bracket 30. According to an embodiment, it is desirable to have a structure in which, after the camera module 20 is mounted on the bracket 30, the stopper protrusions 221 and 222 are restrained by the mounting ends 301 and 302 at a height at which the bottom portion of the camera module 20 does not protrude to the rear side of the bracket 30. However, the present disclosure is not limited thereto, and thus if an additional electronic component does not exist as a support means in the rear side of the bracket 30 and if an extra space is present, the bottom portion of the camera module 20 may be installed such that the bottom portion passes through the opening 31 of the bracket 20 and protrudes to the rear side.

According to various embodiments, the stopper protrusions 221 and 222 formed on the camera module 20 in a protrusion manner and the open portions 321 and 322 and the mounting ends 301 and 302 of the bracket 30 applied to the stopper protrusions 221 and 222 are placed as two components at positions facing each other. However, if a space is allowed, more than two components may be placed according to a type and shape of a module in use.

According to various embodiments, the stopper protrusions 221 and 222 formed at both sides, facing each other, of the camera module 20 may face each other in an overlapping manner or may be disposed in an offset manner. According to an embodiment, the stopper protrusions 221 and 222 may be formed at both sides, adjacent to each other, of the body 22 or may be both formed at a plurality of lateral sides.

Figure 5:
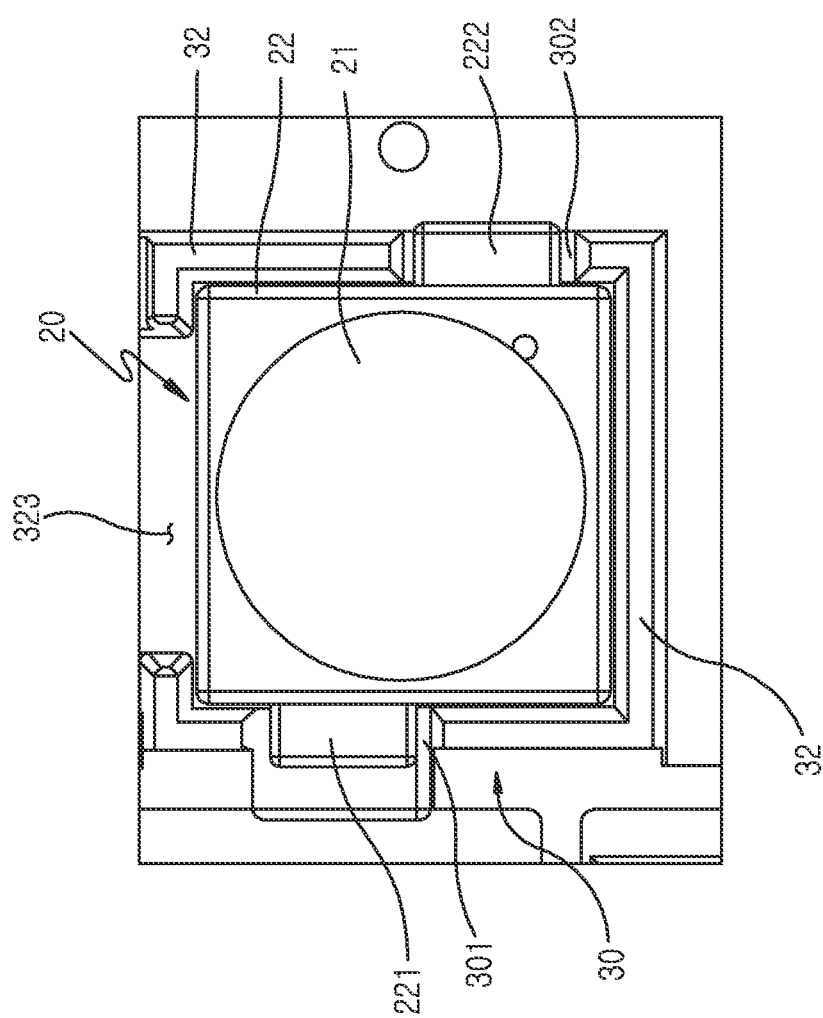
FIG. 5 is a plan view illustrating a state of mounting a camera module on a bracket according to an embodiment of the present disclosure.
Figure 6:
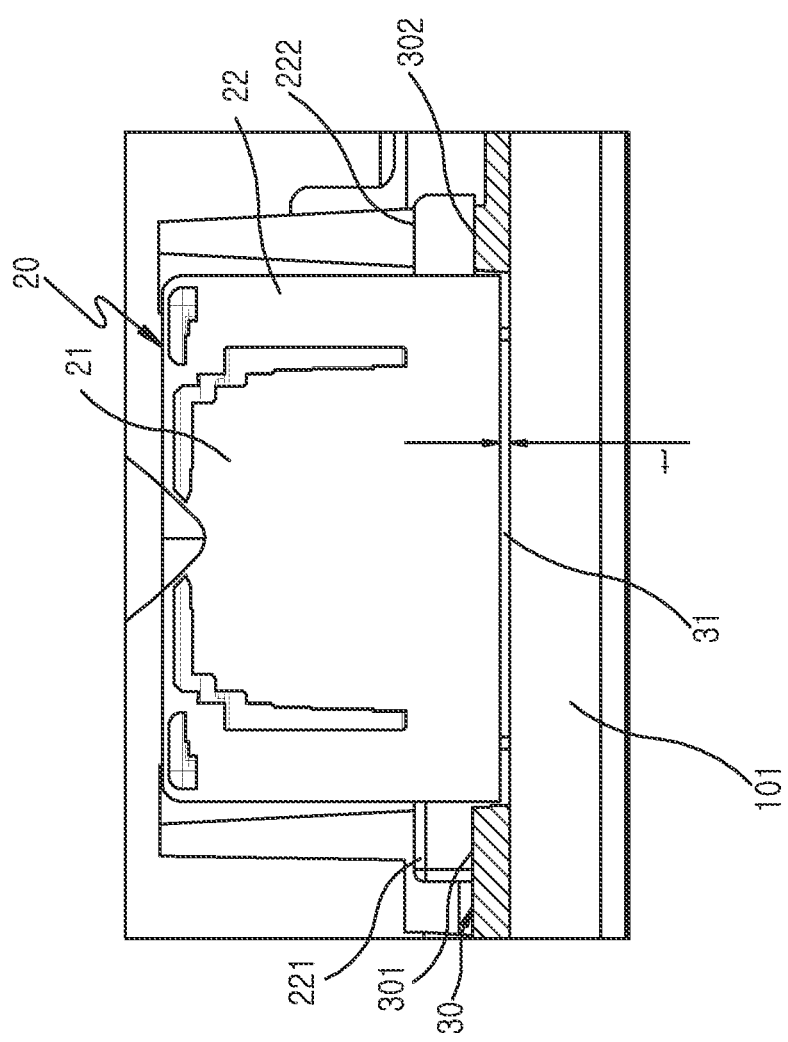
FIG. 6 is a cross-sectional view illustrating an important part of a state of mounting a camera module on a bracket according to an embodiment of the present disclosure.
Figure 7:
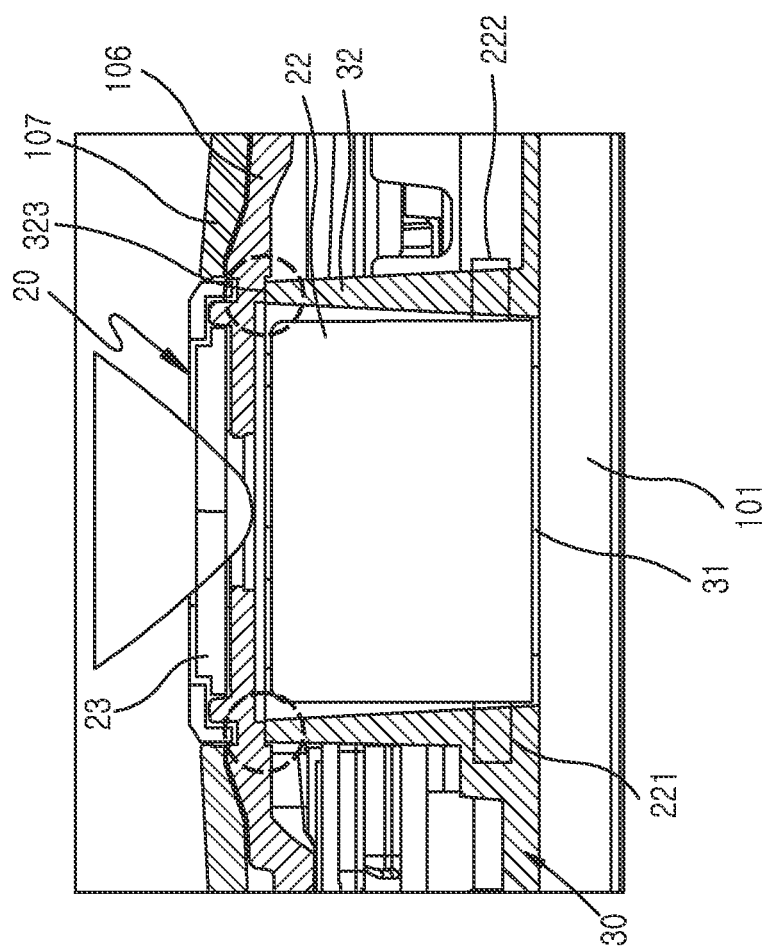
FIG. 7 is a cross-sectional view illustrating an important part of an electronic device in which a camera module is installed according to an embodiment of the present disclosure.

FIG. 5 is a plan view illustrating a state of mounting a camera module on a bracket according to an embodiment of the present disclosure. FIG. 6 is a cross-sectional view illustrating an important part of a state of mounting a camera module on a bracket according to an embodiment of the present disclosure. FIG. 7 is a cross-sectional view illustrating an important part of an electronic device in which a camera module is installed according to an embodiment of the present disclosure.

Referring to FIG. 5 to FIG. 7, the camera module 20 may be mounted in a direction of an opening in such a manner that the body 22 is supported by the support rib 32 of the bracket 30. In this case, the stopper protrusions 221 and 222 formed on the body 22 of the camera module 20 in a protrusion manner are respectively contained in the open portions 321 and 322 formed on the support rib 32, and may finally be mounted on the first and second mounting ends 301 and 302. According to an embodiment, the body 22 of the camera module 20 is fixed such that the body 22 is not moved by the support rib 32 extended from the bracket 30, and at least two stopper protrusions 221 and 222 are mounted on the mounting ends 301 and 302. In this manner, the camera module 20 can be prevented from randomly moving to the left or the right (i.e., directions x and y) in the bracket 30 after being mounted.

Referring to FIG. 6, the camera module 20 may be mounted on a front side of the bracket 30, and the display module 101 may be supported in a rear side. The camera module 20 may be disposed such that a bottom portion of the camera module 20 is disposed within a rib thickness of the bracket 30 through the opening 31 formed on the bracket 30. According to an embodiment, the conventional camera module mounted on a mounting surface of the bracket without the opening has a mounting structure which requires the same height as the rib thickness of the bracket 30. However, according to various embodiments of the present disclosure, since the camera module 20 is partially inserted through the opening 31 formed on the bracket 30, a distance 't' between the camera module 20 and the display module 101 disposed on the rear side of the bracket 30 may be configured to be less than the rib thickness of the bracket 30. That is, the camera module 20 according to the various embodiments of the present disclosure can secure a mounting space which is greater by 'the rib thickness of the bracket 30—t' than that of the conventional method.

According to an embodiment, when the rib thickness of the bracket 30 is formed conventionally within a range of 0.3 mm to 0.5 mm, the camera module 20 is mounted thereon. However, according to an embodiment of the present disclosure, the opening 31 is formed and the distance t to the rear side of the bracket 30 is decreased to, for example, up to 0 to 0.1 mm, and thus its mounting height can be significantly decreased even if the same-sized camera module 20 is mounted. According to an embodiment, a thickness 't' is a separation distance between the camera module 20 and the display module 101, and may take a role of preventing an external impact exerted on the camera module 20 from being delivered to the display module 101 or preventing an impact exerted on the display module 101 from being delivered to the camera module 20.

Referring to FIG. 7, the support rib 32 formed on the bracket 30 may be formed with a height in contact with the case frame 106 fixed to the bracket 30. According to an embodiment, the case frame 106 may be a rear case frame of the electronic device, and the support rib 32 is preferably extended to up to at least the height of the body of the camera module 20.

According to an embodiment, if the camera module 20 is mounted through the support rib 32 of the bracket 30 and thereafter is finished with the rear case frame 106, an inner surface of the rear case frame 106 is naturally in contact with an upper surface of the support rib 32, and thus the camera module 20 can be firmly fixed. The rear case frame 106 located inside the battery cover 107. With this assembling structure, an impact exerted externally from the electronic device 100 can be prevented from being delivered to the camera module 20. According to an embodiment, with a supporting structure of the rear case frame 106, an impact exerted on a camera window 23 can be prevented from being directly delivered to the camera module 20.

Figure 8:
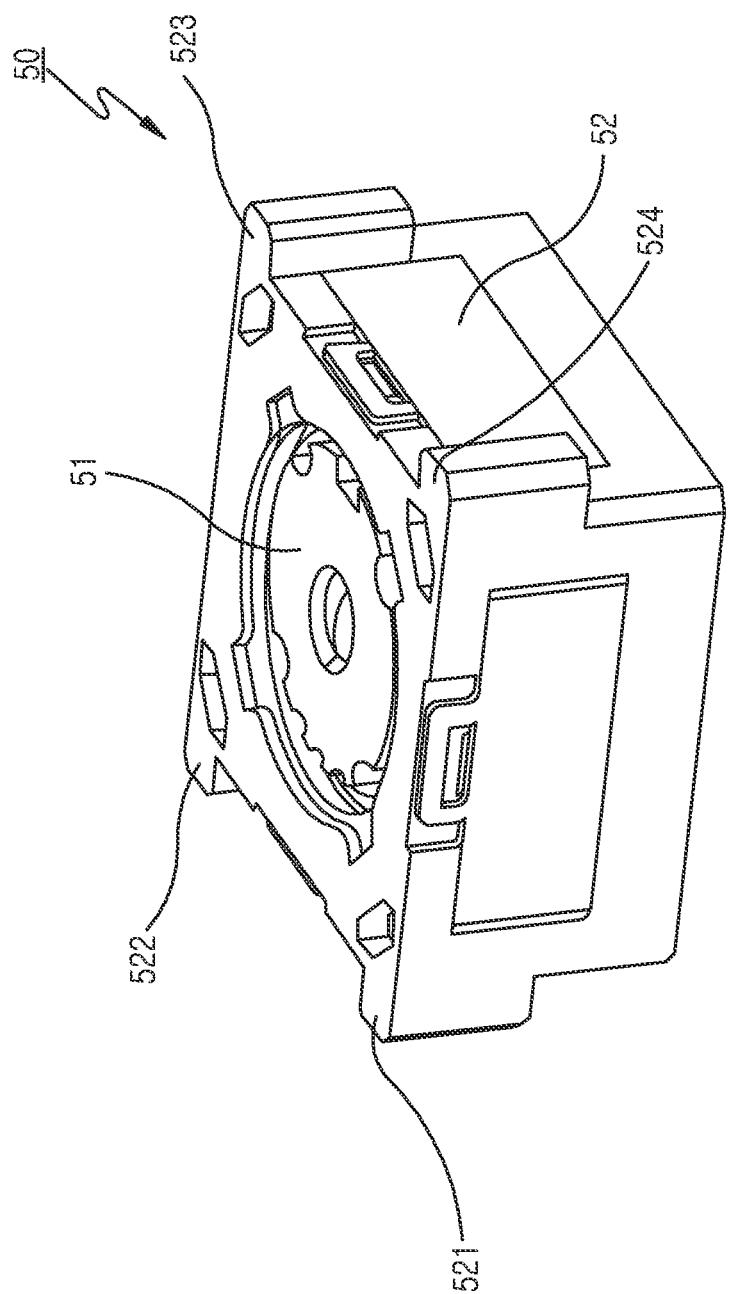
FIG. 8 is a perspective view of a camera module according to an embodiment of the present disclosure.
Figure 9:
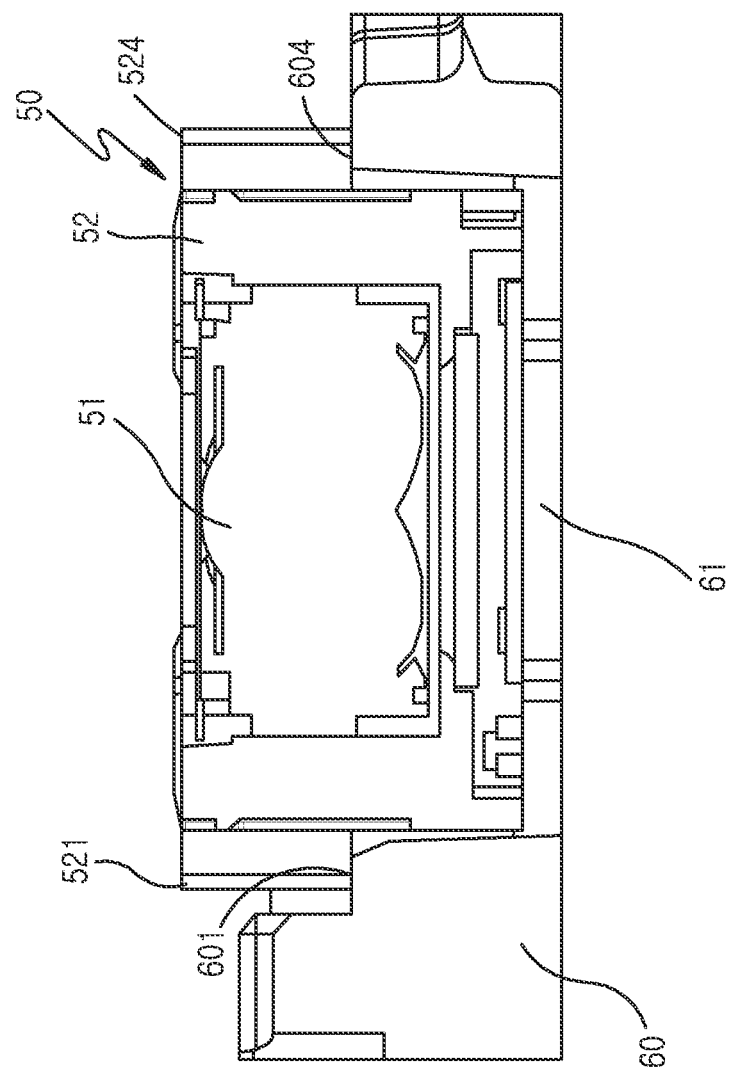
FIG. 9 is a cross-sectional view illustrating an important part of a state of mounting a camera module on a bracket according to an embodiment of the present disclosure.

FIG. 8 is a perspective view of a camera module according to an embodiment of the present disclosure. FIG. 9 is a cross-sectional view illustrating an important part of a state of mounting a camera module on a bracket according to an embodiment of the present disclosure.

Referring to FIG. 8 and FIG. 9, a camera module 50 may be formed in such a manner that an image sensor 51 is protected by a body 52. According to an embodiment, stopper protrusions 521, 522, 523, and 524 which protrude externally may be formed respectively at four corners of an upper portion of the body 52. The stopper protrusions 521, 522, 523, and 524 may be mounted on respective corresponding mounting ends 601 and 604 formed around an opening 61 that is formed on a bracket 60 to contain the camera module 50.

Although it is shown in the cross-sectional view of FIG. 8 that the two stopper protrusions 521 and 524 of the camera module 50 are mounted on the two mounting ends 601 and 604 of the bracket 60, it is apparent that the remaining two stopper protrusions 522 and 523 can also be mounted on the remaining two mounting ends (not shown).

According to an embodiment, since the stopper protrusions 521, 522, 523, and 524 of the camera module 50 are relatively disposed with a height corresponding to an upper portion of the body 52, in this case, the mounting ends 601 and 604 on which the stopper protrusions 521, 522, 523, and 524 are mounted can also be formed with a specific height extended from a bottom surface of the bracket 60.

According to an embodiment, all of the stopper protrusions formed on the camera module are formed with the same height. However, it is also possible that the stopper protrusions have different heights and thus can be applied to mounting ends having different heights.

According to various embodiments of the present disclosure, by changing only structures of a bracket and a module, an assembly capability can be improved, a manufacturing cost can be saved, and an electronic device can have a slim size.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    at least one module;
    a bracket having an opening configured to contain the at least one module;
    a support rib extending upwardly along a boundary of the opening to support an outer circumferential surface of the at least one module, the support rib having an upper surface located on a plane;
    at least two stopper protrusions formed on the outer circumferential surface of the at least one module to support the at least one module being restrained by the bracket and prevent the at least one module from completely passing through the opening;

open portions configured to respectively contain the at least two stopper protrusions, the open portions being formed facing each other on the support rib, each of the open portions extending up to the plane at a height of the upper surface of the support rib; and a mounting end configured to contain a stopper protrusion of the at least two stopper protrusions is formed on a surface of the bracket corresponding to each of the open portions, wherein a lower portion of the at least one module is partially inserted into the opening of the bracket.

2. The electronic device of claim 1, wherein the mounting end is formed with a same height as the height of the upper surface of the support rib or with a lower height than the height of the upper surface of the support rib.

3. The electronic device of claim 1, further comprising: an open portion configured to take out an electrical connecting means of the at least one module is formed on the support rib.

4. The electronic device of claim 1, wherein the at least two stopper protrusions are formed on opposite sides, facing each other, of the at least one module.

5. The electronic device of claim 4, wherein the at least two stopper protrusions are formed to face each other in an overlapping manner or are formed in positions facing each other in an offset manner.

6. The electronic device of claim 1, wherein the bracket comprises a case frame constituting an exterior of the electronic device.

7. The electronic device of claim 1, wherein the bracket supports at least one another module disposed on an inner side of the electronic device and applied to a rear side in which the at least one module is not mounted.

8. The electronic device of claim 7, wherein the at least one module is installed to pass through the opening and not to be in contact with the at least one another module.

9. The electronic device of claim 8, wherein the at least one another module comprises a display module.

10. The electronic device of claim 1, wherein the upper surface of the support rib is in contact with an inner surface of a case frame assembled with the bracket.

11. The electronic device of claim 10, wherein the at least one module is disposed not to be in contact with the case frame.

12. The electronic device of claim 1, wherein the at least one module comprises at least one of a speaker module, a microphone module, a vibrator module, various sensor modules, an ear jack module, a key button module, a module having an illumination means, and an interface connector module for various communications.

13. A An electronic device comprising a module mounting structure, the module mounting structure comprising: at least one module; a bracket having an opening configured to contain the at least one module; a support rib extending upwardly along a boundary of the opening to support an outer circumferential surface of the at least one module, the support rib having an upper surface located on a plane; at least two stopper protrusions formed on the outer circumferential surface of the at least one module to support the at least one module being restrained by the bracket and prevent the at least one module from completely passing through the opening; open portions configured to respectively contain the at least two stopper protrusions, the open portions being formed facing each other on the support rib, each of the open portions extending up to the plane at a height of the upper surface of the support rib; and a mounting end configured to contain a stopper protrusion of the at least two stopper protrusions is formed on a surface of the bracket corresponding to each of the open portions, wherein a lower portion of the at least one module is partially inserted into the opening of the bracket.

14. The module mounting structure of claim 13, wherein the bracket supports at least one another module disposed on an inner side of the electronic device and applied to a rear side in which the at least one module is not mounted.

15. The module mounting structure of claim 14, wherein the at least one module is installed to pass through the opening and not to be in contact with the at least one another module.

16. The module mounting structure of claim 13, wherein the at least one module comprises at least one of a speaker module, a microphone module, a vibrator module, various sensor modules, an ear jack module, a key button module, a module having an illumination means, and an interface connector module for various communications.

17. An electronic device comprising:
at least one module;
a bracket having an opening configured to contain the at least one module;
a support rib extending upwardly along a boundary of the opening to support an outer circumferential surface of the at least one module, the support rib having an upper surface located on a plane;
at least two stopper protrusions formed on the outer circumferential surface of the at least one module to support the at least one module being restrained by the bracket and prevent the at least one module from completely passing through the opening;
at least one open portion formed on the support rib to contain at least one of the at least two stopper protrusions, the at least one open portion extending up to the plane at a height of the upper surface of the support rib; and
a mounting end, formed on a surface of the bracket corresponding to an open portion of the at least one open portion to have a lower height than the height of the upper surface of the support rib, configured to contain a stopper protrusion of the at least two stopper protrusions,
wherein a lower portion of the at least one module is partially inserted into the opening of the bracket.

18. The electronic device of claim 17,
wherein the bracket supports at least one another module disposed on an inner side of the electronic device and applied to a rear side in which the at least one module is not mounted, and
wherein the at least one module is installed to pass through the opening and not to be in contact with the at least one another module.

* * * * *